April 30, 1957

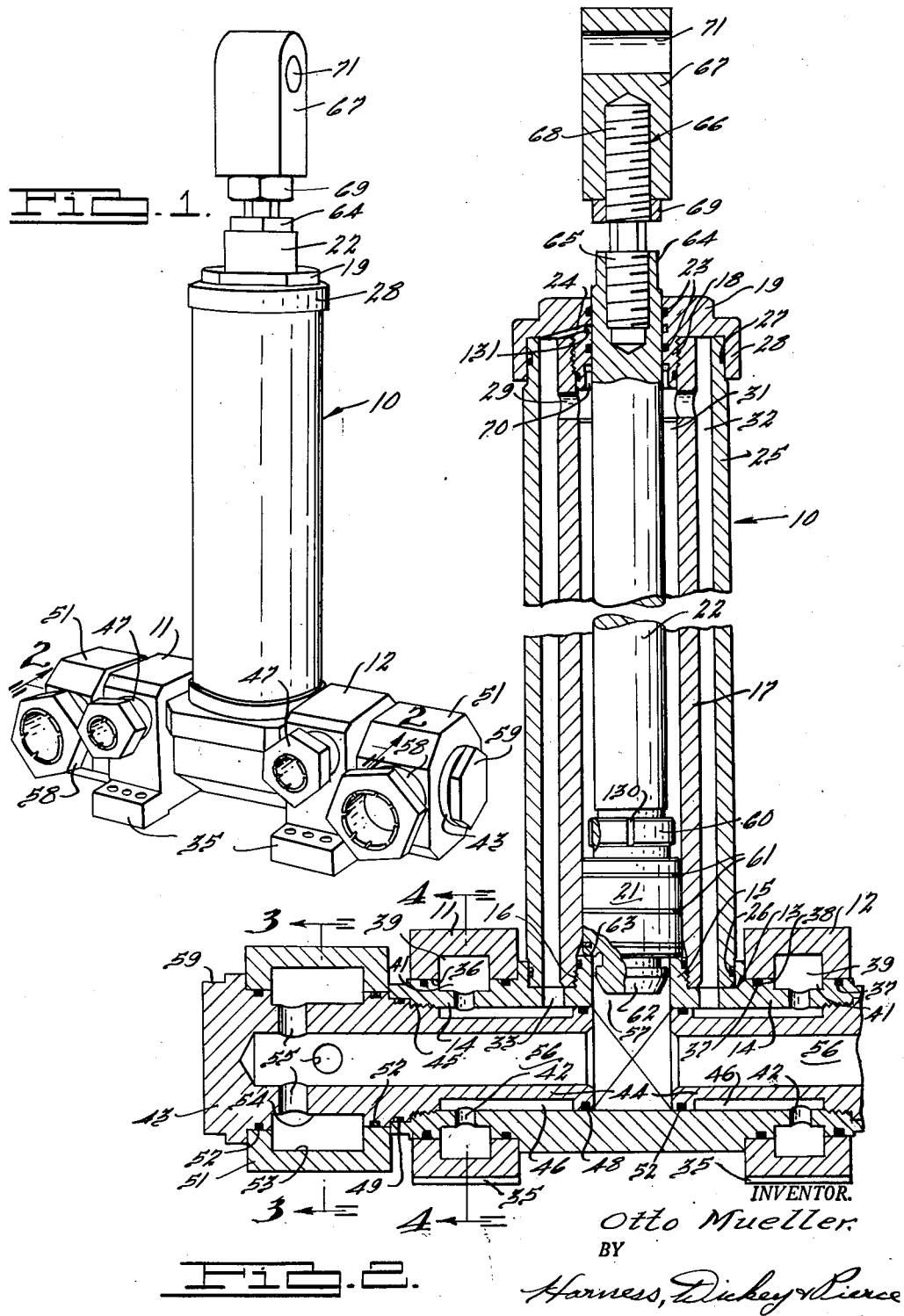

O. MUELLER 2,790,426

FLUID DEVICE HAVING JOINTS IN SWIVELED
FLUID CONDUCTING RELATIONSHIP

Filed June 11, 1952

INVENTOR.
Otto Mueller.
BY
Harness, Dickey & Pierce
ATTORNEYS.

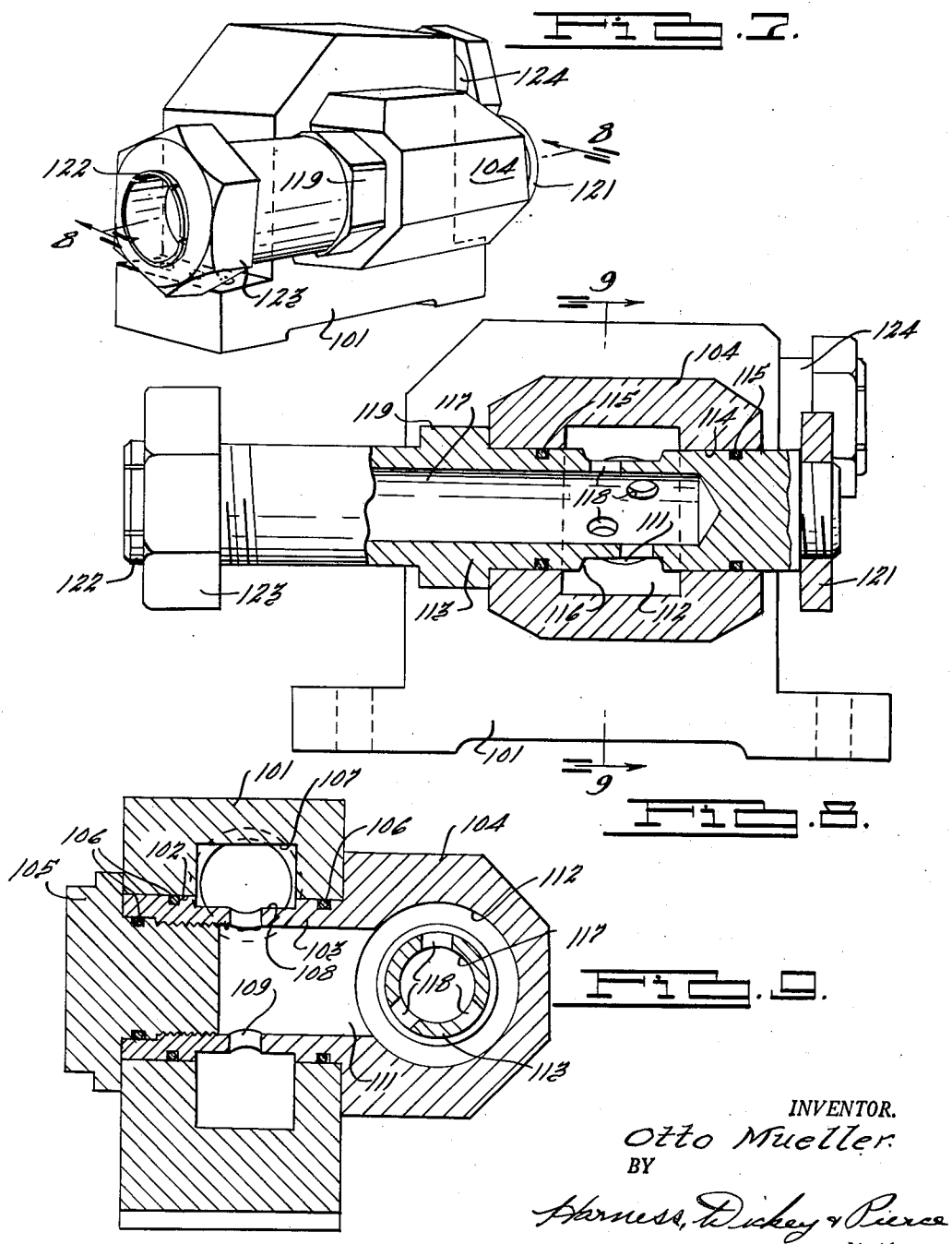

United States Patent Office 2,790,426
Patented Apr. 30, 1957

2,790,426

FLUID DEVICE HAVING JOINTS IN SWIVELED FLUID CONDUCTING RELATIONSHIP

Otto Mueller, Dearborn, Mich.

Application June 11, 1952, Serial No. 293,009

11 Claims. (Cl. 121—46)

This invention relates to swivel fluid devices, and particularly to devices for the transmission of fluid which may be swung through an angle of 360°.

Difficulty has been experienced in the past when connecting large conduits for hydraulic fluids under high pressure because of the difficulty of tightening the threaded joint and the use of extremely heavy fittings which were limited to 45° and 90° disposition of the ports.

To overcome the difficulties above pointed out, a swivel device was invented for interconnecting the conduits which may be swung to have the ports in angular relation to each other from zero to 360° while permitting axial lengthening of the conduit. Included in the inventive concept is a swivel device for conduits which is applied directly to a cylinder, which thereby permits the cylinder to be swung through an angle of zero to 360°. With this arrangement, the piston rod operates at any angle relative to the port openings and may swing at the time the piston operates within the cylinder.

Accordingly, the main objects of the invention are: to provide a pair of ports for joining conduits which are so related as to be relatively moved through an angle from zero to 360°, with one conduit portion shiftable axially; to provide a cylinder mounted on trunnions which are in swivel relation to the ports through which the fluid is conducted to and from the cylinder, which thereby permits the cylinder to be positioned from zero to 360° relative to the ports; to mount a cylinder on trunnions which swivel in the conduit blocks of greater capacity for the fluid conducted to the piston end and through conducting blocks of smaller capacity for a return path for the fluid from the rod end of the piston, the capacities being related as the differential between piston area at the free and rod ends, and, in general, to provide a fluid conducting device which may be adjusted to a position between zero to 360°, which is simple in construction, positive of operation, and economical of manufacture and use.

Other objects and features of novelty of the invention will be specifically pointed out or will become apparent when referring, for a better understanding of the invention, to the following description taken in conjunction with the accompanying drawings, wherein:

Figure 1 is a view of a hydraulic device having ports providing connections to fluid conduits which permit the device to be positioned at any point through 360°;

Fig. 2 is an enlarged, broken sectional view of the structure illustrated in Fig. 1, taken on the line 2—2 thereof;

Fig. 7 is a perspective view of a device having ports connectible to conduits which may be positioned on an angle from 0° to 360° from each other;

Fig. 8 is an enlarged broken sectional view of the structure illustrated in Fig. 7, taken on the line 8—8 thereof, and Fig. 9 is a view of structure, similar to that illustrated in Fig. 8, taken on the line 9—9 thereof.

Figure 3:
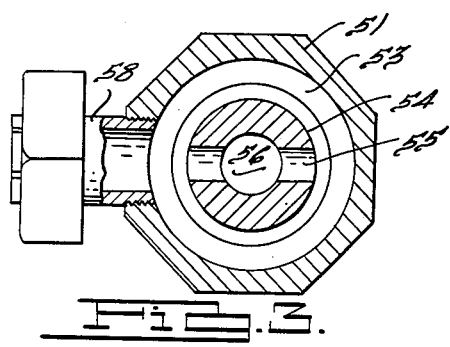
Fig. 3 is a sectional view of the structure illustrated in Fig. 2, taken on the line 2—2 thereof.
Figure 4:
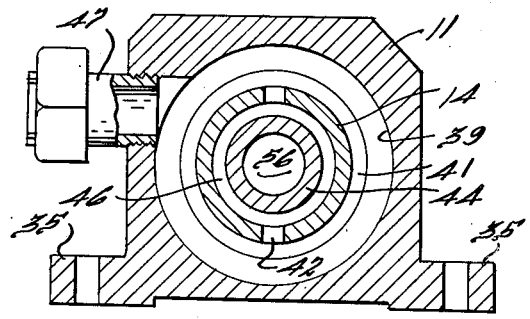
Fig. 4 is a sectional view of the structure illustrated in Fig. 2, taken on the line 4—4 thereof.

Referring specifically to Figs. 1 to 4, the device of the present invention is therein illustrated as embodying a cylinder 10 which is mounted in swingable relation on supporting blocks 11 and 12, the mounting being such as to permit the cylinder to swing through an arc of 360°. A cylinder supporting trunnion plate 13 has a pair of diametrically disposed tubular trunnions 14 extending in aligned relation to each other. A sleeve portion 15 communicates with the hollow interior of the trunnion portions 14 and extends at a right angle therefrom and is provided with an external thread 16 on its outer surface. A cylinder 17 is threaded onto the threads 16 of the sleeve 15 and has the upper end threaded onto an annular flange 18 of an end cap 19. A piston 21 is mounted within the cylinder 17, having a rod 22 extending therefrom in position to project from the end of the cap 19 and to be sealed thereto by the plurality of O-rings 23 provided in the inner face of the cylindrical collar 18 of the cap.

Suitable means are provided for conducting fluid to and from the area between the piston rod 22 and the inner surface of the cylinder 17, which may be a conduit connected thereto and to the trunnion 14. One manner to provide such a connection is illustrated in the figure which embodies the provision of a cylinder 25 telescoped over the cylinder 17 and sealed to the trunnion plate 13 in a suitable manner, herein illustrated as by an O-ring 26. At the upper end the cylinder 25 is connected to a downwardly extending peripheral flange 28 on the cap 19 and is sealed thereto by the engagement of an O-ring 27 therewith. A plurality of apertures 29 are provided through the upper end of the cylinder 17 for the passage of fluid from the space 31 between the cylinder 17 and rod 22 to the space 32 between the cylinders 17 and 25.

The trunnion plate 13 is provided with a plurality of openings 33 communicating with the opening 32 outwardly of the aperture in the sleeve 15 of the plate. Each of the trunnions 14 is mounted in the supporting blocks 11 and 12 having attaching feet 35 thereon by which the blocks are secured to a support, which are spaced apart if the cylinder is to be swung downwardly therebetween. The blocks have a bore 36 therein for receiving the trunnions 14 in which they are free to pivot and are sealed by O-rings 37 disposed in slots 38 in the outer wall of the trunnions. An annular fluid passageway 39 is provided in each of the blocks 11 and 12 in open communication with annular passageways 41 in the outer face of the trunnions 14. A plurality of apertures 42 are provided through the walls of the trunnions communicating with the annular passageway 41 thereabout. A pair of conduits 43 has sleeve portions 44 which extend within the apertures of the trunnions 14, being retained therein through the engagement of threads 45. An annular recess 46 is provided about the sleeve 44 which connects the passageways 33 with the passageways 42 to thereby connect the fluid within the area 32 between the cylinders 17 and 25 with the passageways 39 in the supporting blocks 11 and 12 containing the fittings 47 to which fluid conductors may be connected.

O-rings 48 and 49 seal the sleeve portions 44 of the conduits 43 to the trunnions 14 and to the fluid delivery blocks 51 which are in pivotal relation on the end of the conduits 43. The fluid delivery blocks 51 are sealed to the fluid conduits 43 by the O-rings 52. The blocks 51 have an annular passageway 53 which is in direct communication with an annular passageway 54 on the conduits 43. A plurality of apertures 55 join the annular passageway 54 with the interior passageway 56 of the conduits 43 which are in direct communication with the aperture 57 in the sleeve 15 of the trunnion plate 13. Fittings 58 are disposed in communication with the passageway 53 on the delivery blocks 51 to which fluid conductors may be directly joined. Hexagonal shaped heads 59 may be provided on the end of the conduits 43 for the reception of the wrench for tightening the conductor on the trunnions.

In this arrangement the cylinder 10 is swingable on the trunnions 13 relative to the supporting blocks 11 and 12. The conduits 43, being threaded into the trunnions 14, swing with the trunnions and therefore are movable relative to the conductor blocks 51. With this arrangement the cylinder 10 is swingable through 360° of arc while maintaining fluid connection to the blocks 11 and 12 and to the blocks 51 to which the fluid conductors are connected. The larger flow of fluid through the conduits 43 provides a greater volume of fluid to the passage 57 for producing the working stroke or outward movement of the piston 21. Taking into consideration the diameter of the piston rod, the volume of the passageway 57 preferably directly related to the volume of the passageway 31 and in the example illustrated is about four to one so that the fluid above the piston by-passed from the cylinder 17 into the space 32 and out through the connectors 47 is one-quarter of the volume delivered below the piston. When the piston is to be retracted, the fluid is reversed, being admitted through the conduits connected to the connectors 47, which is delivered into the passageway 32 and passes into the passageway 31 through the apertures 29 to apply pressure on the downward side of the piston. The oil below the piston is conducted to tank through the conduits 43 and the connectors 58 so that fluid is always maintained on both sides of the piston during either direction of its movement. Piston rings 61 of standard form are employed on the piston 21 for sealing the piston with the cylinder wall.

The end of the piston has a cylindrical portion 62 which traps oil in the pocket formed by the shoulder 63 to prevent shock between the piston and sleeve wall upon the retraction of the piston. Similarly, a collar 60 is provided above the piston extending outwardly of the piston rod 22 in a position to enter the cavity 70 provided between the piston rod and the annular flange 18 of the cap 19 to trap fluid therein upon the outer movement of the piston rod and cushioning the end of the movement. Slots 130 may be provided transverse of the peripheral wall of the collar 60 for relieving the fluid trapped in the cavity. Because of the high pressure developed on the fluid trapped in the cavity 70 which may be of such magnitude as to cause the fluid to flow past the adjacent O-ring 23, such fluid pressure will be relieved by the annular slot 131 in the inner surface of the flange 18 connected by one or more passageways 24 to the space 32 and maintaining the outer O-ring effective to seal the fluid at normal pressure.

A hexagonal head 64 may be provided on the upper end of the piston rod so that the rod may be held against rotation when the threaded end 65 of the connecting stud 66 is rigidly secured therein. A head 67 is mounted on the upper threaded end 68 of the stud 66, being maintained in adjusted position thereon by the nut 69. An aperture 71 in the head 67 receives a pin which connects a device thereto which is to be operated by the piston.

Figure 5:
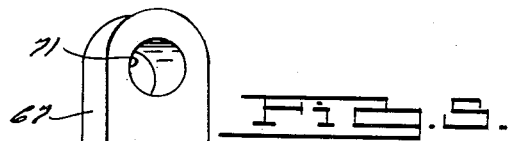
Fig. 5 is a view of structure, similar to that illustrated in Fig. 1, showing a further form thereof.
Figure 6:
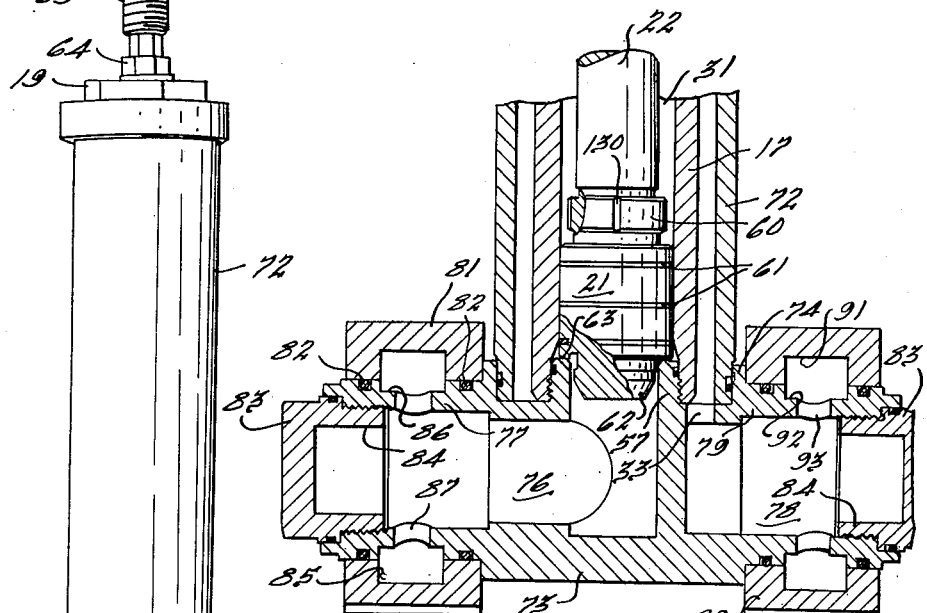
Fig. 6 is an enlarged broken sectional view of the structure illustrated in Fig. 5, taken on the line 6—6 thereof.

Referring to Figs. 5 and 6, an outer cylinder 72 is illustrated which is of similar construction to that illustrated in Figs. 1 to 4 inclusive, with the exception that a single set of conductors is employed rather than the two pairs utilized with the first described device. In this arrangement the trunnion plate 73 has a sleeve 57 which supports a cylinder 17 and a flange 74 extending outwardly therefrom to which the outer cylinder 72 is sealed. The passageway through the sleeve 57 is connected to a passageway 76 on the left-hand trunnion 77, while the passageway 33 in the trunnion plate 73 is connected to the passageway 78 in the right-hand trunnion 79. The trunnion 77 is mounted upon the conducting block 81 and sealed thereto by O-rings 82. An end nut 83 has a stud portion 84 threaded within the end of the trunnion to close one end of an annular passageway 85. The passageway 85 communicates with the annular passageway 86 in the trunnion, which passageways are connected by a plurality of apertures 87 with the trunnion passageway 76. A coupling 88 is a unit part of or is secured to the block 81 in communication with the annular passageway 85 therein.

The trunnion 79 has a block 89 mounted thereon provided with an annular passageway 91 in communication with the annular passageway 92 in the trunnion 79 which has the outer end closed by a nut 83. The passageways 91 and 92 communicate with the trunnion passageway 78 through a plurality of apertures 93. A connector 94 is secured to the block 89 in communication with the passageway 91 thereof. It will be noted that the connector 88 is of larger capacity than the connector 94, as a larger volume of fluid is employed in the passageway of the sleeve 57 than in the passageway 31 due to the differential between the piston area on the bottom of the piston and that at the top thereof. The cylinder 72 is free to be positioned at any point in an arc of 360° relative to the supporting blocks 81 and 89 and free to swing in any portion of the arcuate path during the operation thereof.

Referring to Figs. 7 to 9, a further form of the invention is illustrated, that wherein the supporting block 101 has an aperture 102 therein in which a trunnion 103 of a block 104 is positioned. A nut 105 is threaded into the end of the trunnion to retain it in swivel relation to the block 101. A plurality of O-rings 106 seal the inner surface of the aperture 102 with the outer wall of the trunnion. The block is provided with an annular passageway 107 which communicates with an annular passageway 108 in the trunnion. The wall of the trunnion has a plurality of apertures 109 which communicate with the passageway 111 in the trunnion. The passageway 111 in the trunnion communicates with an annular passageway 112 in the swivel block 104.

A conduit 113 is mounted within the block 104 within an aperture 114 extending therethrough. The conduit 113 is rotatable within the block and is slidable longitudinally therein. The conduit is sealed to the wall of the aperture 104 by O-rings 115. An annular passageway 116 on the conduit 113 communicates with the annular passageway 112 in the swivel block and is joined with a passageway 117 in the conduit through a plurality of apertures 118 through the conduit wall. An enlarged head portion 119 on the conduit 113 positions the conduit in the swivel block 104, while the nut 121, threaded on the opposite end, limits the longitudnial movement of the block 104 which is necessary when the block 101 is mounted on a tiltable platform. A connector 122 is formed on the end of the conduit 113, having a nut 123 thereon which squeezes the connector portion 122 onto a fluid conductor in extension of the conduit 113. The block 101 has a connector 124 on the end thereof communicating with the annular passageway 107 in the interior of the block. In this arrangement a fluid conductor may be connected to the block 101 by the connector 124 and a fluid conductor may be connected to the conduit 113 in angular relation to each other from 0° to 360° due to the swivel relation of the block 104 to the block 101.

In all of the swivel connections here employed, simplicity is provided in connecting the fluid conductors which may approach at any angle to each other, thereby eliminating the 45° or 90° elbows which require the conductors to be bent in an awkward manner to make connections therewith. The blocks may be swiveled to be in direct line with the conductors, thereby eliminating the necessity of bending the large conductors or to thread them into elbow types of connectors. In the past, when swivel cylinders were employed, flexible conductors or threaded joints were used, the former being limited in size and pressures while the latter produced leaks when high pressures were utilized. The cylinders herein described are supported in a manner to be swung to any point in the 360° arc and to oscillate when operated and are of a type which utilizes large volumes of oil at high pressures and are completely sealed against leakage.

What is claimed is:

1. A swivel connection for a pair of fluid conductors embodying a supporting block to which one conductor is securable, a trunnion mounted in swivel relation in said block, and connecting means supported by said trunnion adjacent to said block to which another conductor is connectible in communication with said first conductor in different angular positions of said trunnion.

2. A swivel connection for a pair of fluid conductors embodying a supporting block to which one conductor is securable, a trunnion mounted in swivel relation in said block, a tubular connector in said trunnion to which another conductor is connectible in communication with said first conductor in different angular positions of said trunnion in adjacent parallel planes, and stop means on said tubular connector for permitting a limited longitudinal movement thereof within said trunnion.

3. A swivel connection for a pair of fluid conductors including, in combination, a pair of blocks, trunnion means on one block extending into said other block permitting said blocks to swivel relative to each other, connector means on each said block to which conductors located at various angles to each other may be directly connected in series fluid relation, said blocks being relatively angularly positioned in parallel planes, and stop means on one of said connector means for permitting limited longitudinal movement of said connector means in said block.

4. A swivel connection for a pair of fluid conductors including, in combination, a pair of adjacent blocks one of which is attachable to a support, trunnion means connecting said blocks permitting one block to swivel relative to the other, said trunnion means having independent passageways therein, connector means on each said block to which conductors located at various angles to each other may be directly connected in communication with said trunnion means passageways, said blocks being relatively angularly positioned in parallel planes, a cylinder supported by said trunnion means and disposed normal thereto, and means for conducting fluid to opposite ends of said cylinder from said blocks and trunnion means passageways.

5. In a fluid connecting device, a trunnion having a hollow interior and communicating apertures through its wall, a supporting block having a hollow interior in which said trunnion is adjustable through an angle of 360° with the hollow interiors in communication through said apertures, a connector on said block communicating with said hollow interior, a second block in extension of said trunnion located adjacent to said first block, and a fluid conducting element mounted within said second block for rotation and longitudinal movement relative thereto in communication with said trunnion and connector block.

6. In a fluid operated device, a trunnion plate having a pair of trunnions in axially aligned relation, each said trunnion having a passageway for fluid therein, a supporting block for each of said trunnions sealed thereto and having a passageway communicating with the passageway of the associated trunnion, connectors for conduits on said block communicating with the passageway therein, and means on said block independent of said connectors and passageways by which said blocks are secured in fixed position permitting said trunnions to pivot therein.

7. In a fluid operated device, a trunnion plate having a pair of trunnions in axially aligned relation, each said trunnion having a passageway for fluid therein, a supporting block for each of said trunnions sealed thereto and having a passageway communicating with the passageway of the associated trunnion, connectors for conduits on said block communicating with the passageway therein, a cylinder secured to said trunnion in communication with the passageway in one of said trunnions, a piston within said cylinder, a piston rod on said piston extending from the end of said cylinder opposite to that secured to said trunnion, a cap on the piston rod end of said cylinder sealing said rod thereto, and conducting means from the space between the rod and cylinder to the other of said trunnions, said conducting means embodying a sleeve telescoped over said cylinder and sealed to said trunnion plate and to said cap and having communication with the interior of the cylinder adjacent to said cap, said cylinder being swingable to any position in an arc of 360°.

8. In a fluid actuated device, a trunnion plate having a pair of axially aligned trunnions with openings in communication with each other and with a sleeve having a passageway extending from said plate, a cylinder in extension of said sleeve, a piston in said cylinder, a piston rod on said piston extending from the open end of the cylinder, a cap on the open end of the cylinder sealing the piston rod thereto, conduits extending through the trunnions having communication with the passageway through the sleeve to the bottom of the cylinder and piston, swivel blocks having internal passageways secured to said conduits, connectors on the swivel blocks having communication with the passageways therein, said last passageways communicating with the interior of the conduits through apertures in the walls thereof, blocks having internal passageways supported upon the trunnions in sealed relation thereto, connectors on said second blocks communicating with the passageway therein, and a return passageway from the cap end of the cylinder communicating with the passageways within said second blocks, said mounting permitting the cylinder to swivel to any point in an arc of 360°.

9. In a fluid actuated device, a trunnion plate having a pair of axially aligned trunnions with openings in communication with each other and with a sleeve having a passageway extending from said plate, a cylinder in extension of said sleeve, a piston in said cylinder, a piston rod on said piston extending from the open end of the cylinder, a cap on the open end of the cylinder sealing the piston rod thereto, conduits extending through the trunnions having communication with the passageway through the sleeve to the bottom of the cylinder and piston, swivel blocks having internal passageways secured to said conduits, connectors on the swivel blocks having communication with the passageways therein, said last passageways communicating with the interior of the conduits through apertures in the walls thereof, blocks having internal passageways supported upon the trunnions in sealed relation thereto, connectors on said second blocks communicating with the passageway therein, and a return passageway from the cap end of the cylinder communicating with the passageways within said second blocks, said mounting permitting the cylinder to swivel to any point in an arc of 360°, said return passageway embodying a second cylinder spaced from said first cylinder in combination therewith at the top thereof, said second cylinder being sealed to said trunnion plate and said cap.

10. A swivel connection for a pair of fluid conductors including, in combination, a pair of blocks attachable to a support, each said block having a passageway, trunnion means having passageways disposed for angular movement within said blocks, a second pair of blocks on said trunnion means disposed in swivel relation to each other thereon and to said first pair of blocks, each said second block having a passageway, and connector means on said blocks communicating with the passageways in said trunnion means through the passageways of said blocks, which communication is maintained in all positions of oscillation of said trunnion means in said blocks.

11. In a fluid actuated device, a cylinder, a piston in said cylinder, a plate secured to one end of the cylinder having aligned trunnion means thereon containing a pair of passageways, a pair of blocks connected to said trunnion means having a passageway communicating with one of the passageways in said trunnion means for conducting fluid to and from one end of the cylinder, and an additional pair of blocks connected to said trunnion means each having a passageway communicating with the other passageway in said trunnion means for conducting fluid to and from the opposite end of the cylinder, said cylinder being swingable on said trunnion means through an angle of 360°.

References Cited in the file of this patent

UNITED STATES PATENTS

| | | |
|---|---|---|
| 845,827 | Steedman | Mar. 5, 1907 |
| 1,559,706 | Jennings | Nov. 3, 1925 |
| 1,656,149 | Hopkins | Jan. 10, 1928 |
| 2,083,970 | Walter | June 15, 1937 |
| 2,210,088 | Longfield | Aug. 6, 1940 |
| 2,293,167 | Overbeke | Aug. 18, 1942 |
| 2,325,464 | Bannister | July 27, 1943 |
| 2,359,846 | Hayman | Oct. 10, 1944 |
| 2,382,457 | Wertman | Aug. 14, 1945 |
| 2,450,895 | Keim | Oct. 12, 1948 |
| 2,676,037 | Mueller | Apr. 20, 1954 |

FOREIGN PATENTS

| | | |
|---|---|---|
| 465,429 | France | Feb. 6, 1914 |